(12) United States Patent
Wu et al.

(10) Patent No.: US 6,793,845 B1
(45) Date of Patent: Sep. 21, 2004

(54) FOAM PREMIXES HAVING IMPROVED PROCESSABILITY

(75) Inventors: Jinhuang Wu, Lower Providence, PA (US); Laurent S. J. Caron, Lyons (FR)

(73) Assignee: Atofina Chemicals, Inc., Philadelphia, PA (US)

( * ) Notice: Subject to any disclaimer, the term of this patent is extended or adjusted under 35 U.S.C. 154(b) by 14 days.

(21) Appl. No.: 10/420,472

(22) Filed: Apr. 22, 2003

(51) Int. Cl.⁷ .................. C08G 18/00; C08G 18/08; C08K 3/00
(52) U.S. Cl. ................. 252/182.24; 510/412; 510/415; 516/12; 521/131; 521/98
(58) Field of Search .................. 510/412, 415; 516/12; 521/131; 252/182.24

(56) References Cited

U.S. PATENT DOCUMENTS

| | | | |
|---|---|---|---|
| 5,196,137 A | | 3/1993 | Merchant .................. 252/172 |
| 5,723,509 A | * | 3/1998 | Werner et al. |
| 6,472,444 B1 | * | 10/2002 | Harris et al. |
| 2002/0061935 A1 | * | 5/2002 | Harris et al. |

* cited by examiner

*Primary Examiner*—Morton Foelak
(74) *Attorney, Agent, or Firm*—William D. Mitchell

(57) ABSTRACT

A method for improving the processability of foam premixes containing HFC and/or pentane-based blowing agents in polyols is provided, which method comprises adding trans-1,2-dichloroethylene to said premix in an amount effective to enhance said processability.

7 Claims, No Drawings

FOAM PREMIXES HAVING IMPROVED PROCESSABILITY

BACKGROUND OF THE INVENTION

This invention relates to the addition of trans-1,2-dichloroethylene ("trans-1,2") to hydrofluorocarbon ("HFC") and/or pentane-based blowing agents to provide foam premixes having improved "processability", that is, to provide foam premixes in which the blowing agents create a one phase system with the polyol and/or in which the blowing agents have improved solubility in the polyol and/or in which the vapor pressure of the premix is lowered, and/or in which the premix has a lowered viscosity.

Zero ODP (ozone depletion potential) compounds such as HFCs and pentanes have been identified as alternatives for chlorofluorocarbons (CFCs) and hydrochlorofluorocarbons (HCFCs) as foam blowing agents. However, unlike HCFC-141b (1,1-dichloro-1-fluoroethane), HFCs such as 1,1,1,3,3-pentafluoropropane ("245fa"), 1,1,1,3,3-pentafluorobutane ("365mfc") and 1,1,1,2-tetrafluoroethane ("134a") have limited miscibility with polyurethane raw materials such as polyols, especially polyester polyols. For hydrocarbons such as n-pentane and iso-pentane, their miscibility with polyols, especially polyester polyols, is also low. This low miscibility results in several undesirable processing problems, such as phase separation of the premix resulting in inconsistency in foam production, high viscosity with resulting emulsions and mixing difficulties, and high vapor pressures. What is thus needed is a means of overcoming these processing problems with the new blowing agent alternatives.

Trans-1,2 has been mentioned as a component of azeotrope-like blowing agent blends, as in U.S. Pat. No. 5,196,137, but its disclosure as a premix compatibilizing agent has not been disclosed.

BRIEF SUMMARY OF THE INVENTION

A method for improving the processability of foam premixes containing HFC and/or pentane-based blowing agents in polyols (especially polyester polyols) is provided, which method comprises adding trans-1,2 to said premix in an amount effective to enhance the processability of the premix. Preferred HFCs include 245fa, 365mfc and 134a. Preferred pentanes include n-pentane and iso-pentane.

DETAILED DESCRIPTION

It has now been surprisingly found that the use of trans-1,2 improves the processability and compatibility of HFCs and/or pentanes in polyol premixes. The amount effective to achieve this improvement is dependent on the specific blowing agent and the type of polyols, although this improvement is found to be especially beneficial with the polyester polyols. The premixes can be converted into polyurethane foams via conventional techniques, such as handmix, high pressure impingement, low pressure mechanical mixing, spray and the like. Auxiliary blowing agents may also be present with the HFC and/or pentane blowing agents, such as water, HCFCs, and hydrochlorocarbons.

The blowing agent can be distributed between the "A" and "B" sides of the foam composition. All or a portion of it can also be added at the time of injection or mixing as a third stream.

The other components of the premix and foam formulations may be those which are conventionally used, which components and their proportions are well known to those skilled in the art. For example, fire retardants, surfactants and polyols are typical components of the premix (B-side), while the A-side is primarily comprised of polyisocyanate. In making foam, the A and B sides are typically mixed together, followed by injection of the catalyst, after which the mixture is poured into a mold or box.

The practice of the invention is illustrated in more detail in the following non-limiting examples. First, compatibility of HFC blowing agents (245fa and 365mfc) with and without trans-1,2 was tested in polyester polyol (Stepanol PS2412 with hydroxyl number of 230–250 from Stepan Company). When 39 parts of 245fa was added to 100 parts of the polyester polyol without trans-1,2, phase separation occurred. When trans-1,2 was added to 245fa in a 50/50 weight ratio, a homogeneous, one phase polyol mixture was obtained at a level equivalent to about 50 parts of 245fa to 100 parts polyol. Similar results were found when 365mfc replaced the 245fa. Second, the vapor pressure of 134a and 134a/trans-1,2 blends in polyether and polyester polyols was measured. In both polyols, addition of trans-1,2 was found to lower the vapor pressure of the premix, although the improvement was found to be most significant with the polyester polyol.

We claim:

1. A method for improving the processability of foam premixes containing HFC or pentane-based blowing agents in polyols, which method comprises adding trans-1,2-dichloroethylene to said premix in an amount effective to enhance said processability of the premix.

2. The method of claim 1 wherein the polyol is a polyester polyol.

3. The method of claim 1 wherein the HFC is 245fa, 365mfc or 134a.

4. The method of claim 1 wherein the pentane is n-pentane or iso-pentane.

5. A method for improving the processability of foam premixes containing blowing agents and polyols, which method comprises adding trans-1,2-dichloroethylene to said premix in an amount effective to enhance said processability of the premix.

6. The method of claim 5 wherein the premix contains at least one hydrofluorocarbon blowing agent.

7. The method of claim 5 wherein the premix contains at least one hydrocarbon blowing agent.

* * * * *